(12) United States Patent
Ting

(10) Patent No.: US 7,545,476 B2
(45) Date of Patent: Jun. 9, 2009

(54) METHOD FOR MANUFACTURING A LIQUID CRYSTAL DISPLAY DEVICE WITH OPTICALLY COMPENSATED BEND MODE

(75) Inventor: Chin-Kuo Ting, Tao Yuan Shien (TW)

(73) Assignee: AU Optronics Corporation, Hsin-Chu (TW)

( * ) Notice: Subject to any disclaimer, the term of this patent is extended or adjusted under 35 U.S.C. 154(b) by 174 days.

(21) Appl. No.: 11/602,203

(22) Filed: Nov. 21, 2006

(65) Prior Publication Data
US 2007/0153189 A1   Jul. 5, 2007

(30) Foreign Application Priority Data
Dec. 29, 2005   (TW) .................................. 094147191

(51) Int. Cl.
G02F 1/13 (2006.01)
G02F 1/1337 (2006.01)
(52) U.S. Cl. .................... 349/187; 349/129; 349/130; 349/177
(58) Field of Classification Search ................. 349/123, 349/129, 130, 177, 187
See application file for complete search history.

(56) References Cited

U.S. PATENT DOCUMENTS

| 2003/0133065 A1 | 7/2003 | Okada et al. ................. 349/123 |
| 2003/0142256 A1* | 7/2003 | Maeda et al. ................ 349/115 |

FOREIGN PATENT DOCUMENTS

JP   7253578   10/1995

* cited by examiner

*Primary Examiner*—Brian Healy
*Assistant Examiner*—Michael P Mooney
(74) *Attorney, Agent, or Firm*—Bacon & Thomas, PLLC

(57) ABSTRACT

A method for manufacturing a substrate of a flat panel display device is disclosed. The method includes following steps: providing a substrate having patterned transparent electrode thereon; and forming an alignment layer on the surface of the transparent electrode. The formed alignment layer includes a homeotropic alignment film and a homogeneous alignment film adjacent to the homeotropic alignment film. Moreover, the homeotropic alignment film is formed utilizing printing on or on a periphery of to the homogeneous alignment film. Through this method, the flat panel display device can be manufactured without increasing the quantity of the mask cycles, and without a complex process of gradation exposure. Moreover, the problem resulted from multiple rubbing can be reduced, and the cost for manufacturing can be decreased.

14 Claims, 5 Drawing Sheets

(A)

(B)

(C)

(D)

METHOD FOR MANUFACTURING A LIQUID CRYSTAL DISPLAY DEVICE WITH OPTICALLY COMPENSATED BEND MODE

BACKGROUND OF THE INVENTION

1. Field of the Invention

The present invention relates to a method for manufacturing a substrate of a flat panel display device and, more particularly, to a method for manufacturing a substrate of a flat panel display device with nematic liquid crystal molecules.

2. Description of Related Art

The requirements for a colorful flat panel display device nowadays have a tendency toward large panel size, high resolution, and high image quality. To meet the requirement of high image quality for the flat panel display device, the Uchida Laboratory of Tohoku University developed an optically compensation bend mode (OCB-mode) liquid crystal display device, which has higher response speed and wider viewing angle than the conventional twisted nematic mode (TN-mode) LCD does.

Generally speaking, to increase the response speed of the OCB-mode LCD, the time that the liquid crystal molecules takes to transform from a splay state into a bend state while applying a voltage needs to be shortened. In the conventional method, the substrate of the OCB-mode LCD is subjected to gradation exposure to form the saw-toothed surface with a taper angle more than 60 degrees over the opaque area of the substrate, i.e. the area where the black matrix (BM) of the LCD covers.

As a result, the liquid crystal molecules over the opaque area can keep the bend state when no voltage is applied, and act as the transition nucleus of the liquid crystal molecules over the transparent area (i.e. the pixel area) when a voltage is applied. The transition time of the liquid crystal molecules is therefore shortened. Unfortunately, the mask used in this manufacturing method is expensive, and the steps of this manufacturing method are difficult and complex.

U.S. Pub. Pat. No. 2003/0133065A1 disclosed a method for forming multiple alignment films, such as homeotropic alignment film and homogeneous alignment film, in the OCB-mode LCD by specific photolithography.

With reference to FIG. 1, there is shown a flowchart for manufacturing alignments films according to prior art U.S. Pat. No. 2003/0133065A1. The method is achieved by forming a transparent electrode 102 and an insulating layer 103 over the substrate 101 first (shown in FIG. 1A). The method is subsequently processed by forming a patterned photoresist 120 on the homogeneous alignment film 110, and coating a homeotropic alignment film 111 on the surface of the homogeneous alignment film 110 and photoresist 120 (shown in FIG. 1B). After a part of the homeotropic alignment film 111 is peeled away, the photoresist 120 is removed to form a patterned homeotropic alignment film 111 (shown in FIG. 1C). Finally, the alignment films are subjected to rubbing by a rubbing roller 130 to improve the homogeneous alignment characteristic of the homogeneous alignment film 110.

In other words, this method is achieved by forming the homogeneous alignment film over the pixel area (i.e. the transparent area) functioning as the homogeneous alignment zone, and forming the homeotropic alignment film over the non-display area (i.e. the opaque area) functioning as the homeotropic alignment zone. However, excessive exposure with the mask is still needed in this method. Hence, the manufacturing cost of the OCB-mode LCD is still high.

In addition, the method for forming multiple alignment films in the OCB-mode LCD can also be achieved by forming a homeotropic alignment film first. Then a photoresist is coated on homeotropic alignment film, and defined in the opaque area by photolithography to expose a part of the homeotropic alignment film. After that, the homeotropic alignment film is subjected to multiple rubbings. Therefore, the exposed homeotropic alignment film with low pretilt angle can function as the homogeneous alignment zone, and the homeotropic alignment film covered by the photoresist can function as the homeotropic alignment zone. However, excessive exposure with the mask is still needed in this method. Hence, the manufacturing cost of the OCB-mode LCD is still high. Besides, the problems of rubbing mura (i.e. the image defect of non-uniform display brightness) and residual pieces caused by repeated rubbings can reduce the yield of the LCD.

So far, it can be seen that many problems such as complex processes, and high manufacturing cost need to be solved for the application of OCB-mode LCD. Therefore, it is desirable to provide an improved method to mitigate and/or obviate the aforementioned problems.

SUMMARY OF THE INVENTION

The method of the present invention is achieved by forming a homeotropic alignment film over the opaque area, i.e. the area corresponding to the black matrix of a liquid crystal display device, of a substrate utilizing printing, whereby the liquid crystal molecules over the opaque area are aligned with high pretilt angles. Therefore, the liquid crystal molecule over the opaque area can act as a transition nucleus, while the liquid crystal molecules as a whole transform from a splay state into a bend state.

The present invention provides a method for manufacturing a substrate of a flat panel display device. The method comprises the following steps: providing a substrate having a patterned transparent electrode thereon, and forming an alignment layer on the surface of the patterned transparent electrode. Besides, the alignment layer comprises a homeotropic alignment film and a homogeneous alignment film adjacent to the homeotropic alignment film, and the homeotropic alignment film is formed on or on a periphery of the homogeneous alignment film utilizing printing. Compared with the conventional methods, an additional mask for forming the alignment layer, a process for preparing a particular mask, and a process for gradation exposure are not needed in the method of the present invention. Besides, the problem caused by repeated rubbing can be prevented. Hence, utilizing the method of the present invention, the cost of manufacturing a substrate of a flat panel display device can be obviously reduced.

In the method of the present invention, the formation of the homogeneous alignment film is not limited. Preferably, the homogeneous alignment film is formed by printing or photolithography. The homeotropic alignment film can be formed utilizing any printing. Preferably, the homeotropic alignment film is formed by ink-jet printing or roller printing.

The location of the homogeneous alignment film is not limited. Preferably, the homogeneous alignment film is formed over the transparent area and opaque area of the substrate simultaneously. The location of the homeotropic alignment film is not limited. Preferably, the homeotropic alignment film is formed over the opaque area of the substrate to align the nematic liquid crystal molecule with a high pretilt angle and to shorten the transition time of the molecule without affecting aperture ratio of the substrate. The pretilt angle of the nematic liquid crystal molecule aligned by the homeotropic alignment film is not limited. Preferably, the pretilt angle is larger than 60 degrees. More preferably, the pretilt angle is larger than 80 degrees.

In one preferred embodiment of the present invention, the homeotropic alignment film is formed on the homogeneous alignment film utilizing ink-jet printing. In another preferred embodiment of the present invention, the homeotropic alignment film is formed on the periphery of the homogeneous alignment film utilizing ink-jet printing. Besides, in these embodiments, the homeotropic alignment films are all formed over the opaque area of the substrate.

In another embodiment of the present invention, the homeotropic alignment film is formed on the homogeneous alignment film utilizing roller printing. In another embodiment of the present invention, the homeotropic alignment film is formed on the periphery of the homogeneous alignment film utilizing roller printing. Besides, in these embodiments, the homeotropic alignment films are all formed over the opaque area of the substrate.

The material of the homogeneous alignment film or the homeotropic alignment film can be any suitable material. Preferably, the material of the homogeneous alignment film is polyimide, and the material of the homeotropic alignment film is polyimide, too.

To meet different requirements of different flat panel display devices, the substrate of the present invention can further comprise a color filter to form a color-filter substrate. Otherwise, the substrate of the present invention can further comprise a thin film transistor to form a thin-film-transistor substrate. In addition, the substrate of the present invention can further comprise a color filter and a thin film transistor to form a color-filter-on-an-array (COA) substrate.

The alignment layer used in the method for manufacture of an OCB liquid crystal display device comprises two kinds of alignment films (homogeneous alignment film and the homeotropic alignment film). In addition, the homeotropic alignment film can be formed over the opaque area of the substrate by roller printing or ink-jet printing. Moreover, the method of the present invention can further co-operate with non-contact alignment treatment, such as photo-alignment and ion-beam alignment. Therefore, the method of the present invention can shorten the transition time of the liquid crystal molecules between the splay state and the bend state. Relative to the prior art, the process for manufacturing the substrate of a flat panel display device can be simplified, and the cost of it can be reduced.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
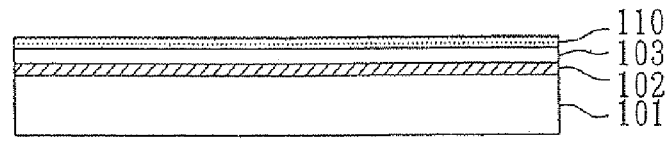
FIGS. 1A to 1D show the steps for manufacturing alignment films according to a conventional method.
Figure 1:
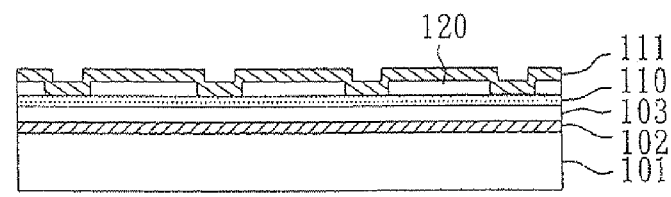
Figure 1:
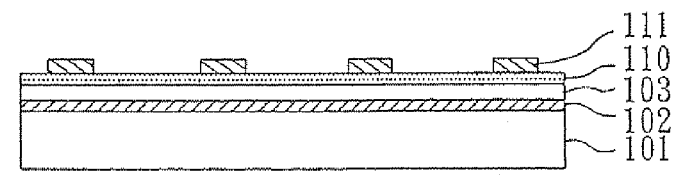
Figure 1:
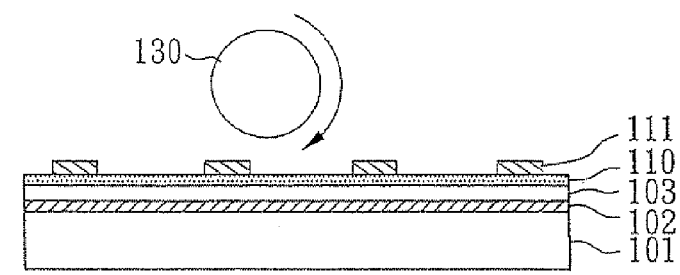
Figure 2A:
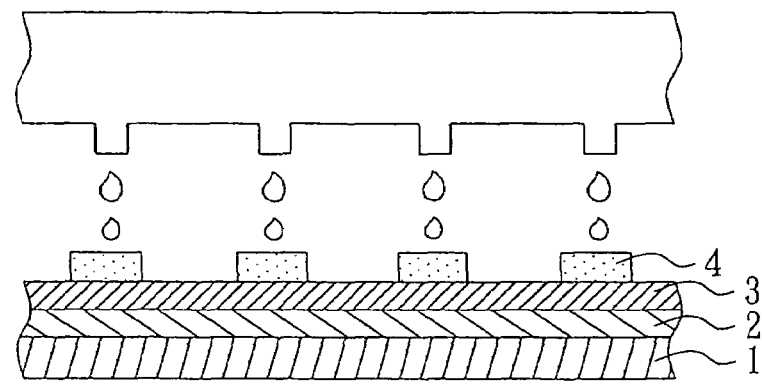
FIG. 2A shows a schematic drawing of forming a homeotropic alignment film over a substrate utilizing ink-jet printing according to a preferred embodiment of the present invention.

With reference to FIG. 2A, this illustrates a schematic drawing of forming a homeotropic alignment film 4 over a substrate 1 utilizing ink-jet printing according to a preferred embodiment of the present invention. As shown in FIG. 2A, the homeotropic alignment film 4 is coated on the upper surface of the homogeneous alignment film 3 in the predetermined area by ink-jet printing. After that, the homeotropic alignment film 4 and the homogeneous alignment film 3 are subjected to rubbing alignment treatment or non-contact alignment treatment to form the high-pretilt angle area and the low-pretilt angle area.

Figure 2B:
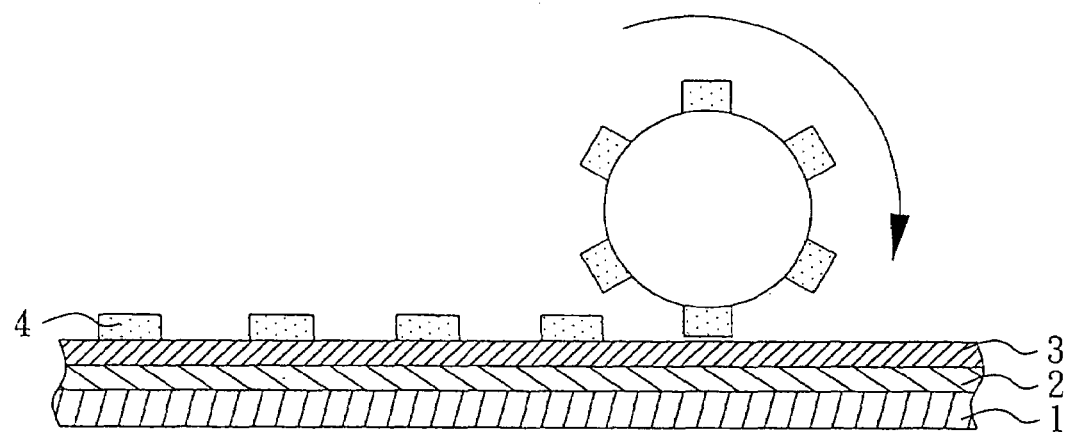
FIG. 2B shows a schematic drawing of forming a homeotropic alignment film over a substrate utilizing roller printing according to another preferred embodiment of the present invention.

With reference to FIG. 2B, this illustrates a schematic drawing of forming a homeotropic alignment film 4 over a substrate 1 utilizing roller printing according to another preferred embodiment of the present invention. In this embodiment, the homeotropic alignment film 4 is printed on a roller first. As shown in FIG. 2B, the roller with patterned homeotropic alignment film 4 contacts with the homogeneous alignment film 3, and prints the patterned homeotropic alignment film 4 on the homogeneous alignment film 3 over the substrate 1. In addition, the homogeneous alignment film 3, as shown in FIGS. 2B and 2A, is formed on the transparent electrode 2 (Indium-tin oxide).

Embodiment 1

Figure 3A:
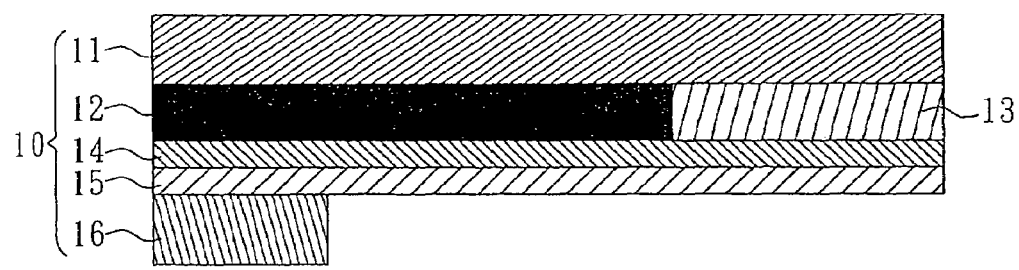
FIG. 3A shows a schematic drawing of a top substrate with a color filter of a flat panel display device according to a preferred embodiment of the present invention.
Figure 3B:
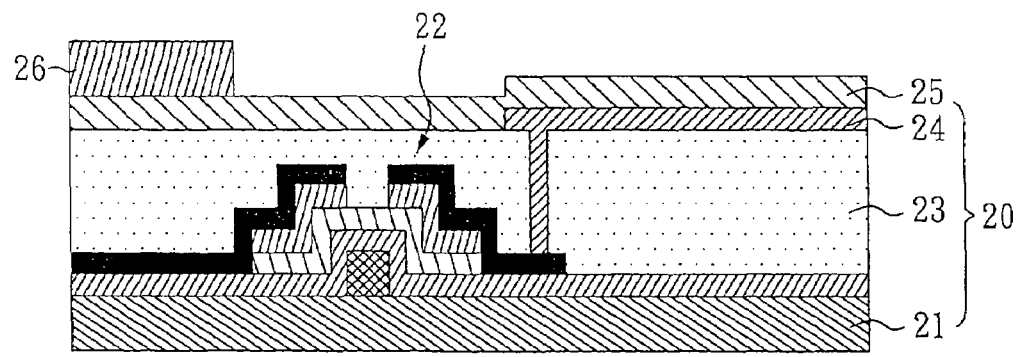
FIG. 3B shows a bottom substrate with a thin film transistor of a flat panel display device according to a preferred embodiment of the present invention.

Referring to FIGS. 3A and 3B, FIG. 3A shows a schematic drawing of a top substrate 10 with color filter 13 of a flat panel display device, and FIG. 3B shows a bottom substrate 20 with a thin film transistor 22 of the same. Assembling the top substrate 10 and the bottom substrate 20 to form a cell, and disposing liquid crystal in the cell can manufacture a flat panel display device.

FIG. 3A shows a schematic drawing of a top substrate 10 of a flat panel display device. As shown in FIG. 3A, the color filter 13 of the top substrate 10 is formed on the glass 11 by photolithography first. Then, the transparent electrode 14 can be formed by sputtering or chemical vapor deposition. In this embodiment, the transparent electrode 14 is formed by sputtering, and the material thereof is indium-tin oxide (ITO) or indium-zinc oxide (IZO). The homogeneous alignment film 15 is then coated on the whole transparent electrode 14 (including the transparent area and the opaque area of the top substrate 10). Beside, the homogeneous alignment film 15 can be coated by conventional coating methods, ink-jet printing, or roller printing. In this embodiment, the homogeneous alignment film 15 is coated by ink-jet printing. Finally, the homeotropic alignment film 16 is coated on the homogeneous alignment film 15 utilizing ink-jet printing or roller printing. Moreover, the location of the homeotropic alignment film 16 corresponds to the area covered by the black matrix 12.

FIG. 3B shows a schematic drawing of a bottom substrate 20 of a flat panel display device. As shown in FIG. 3B, the bottom substrate 20 is manufactured by forming a thin film transistor 22 on the glass 21 first, and then an insulating film 23 is formed on the thin film transistor 22. In this embodiment, the insulating film 23 can be made of organic materials, inorganic materials, or multilayered organic and/or inorganic materials. The insulating film 23 subsequently processed by etching to form a contact hole, and a transparent conductive layer (e.g. indium-tin oxide, or indium-zinc oxide) is then deposited on the insulating film 23 by sputtering or chemical vapor deposition to serve as a pixel electrode 24. The region of the pixel electrode 24 is defined by exposing, developing, and etching. After that, a homogeneous alignment film 25 is coated on the pixel electrode 24 and the exposed insulating film 23 (i.e. the opaque area of the bottom substrate 20) by conventional coating methods, ink-jet printing, or roller printing. Finally, a homeotropic alignment film 26 is coated on the homogeneous alignment film 25 utilizing ink-jet printing or roller printing to produce the bottom substrate 20 of this embodiment. Moreover, the location of the homeotropic alignment film 26 corresponds to the area of the top substrate 10 covered by the black matrix 12.

Embodiment 2

Figure 4A:
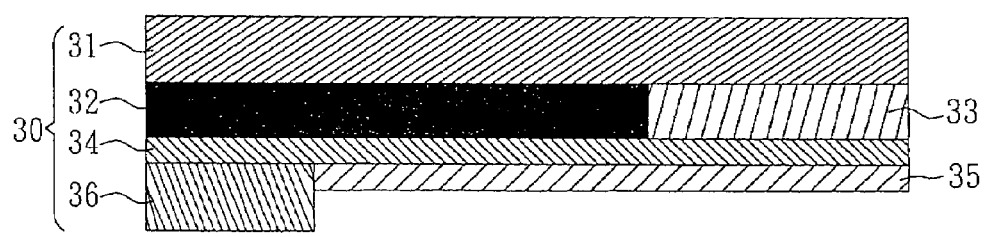
FIG. 4A shows a top substrate with a color filter of a flat panel display device according to another preferred embodiment of the present invention.
Figure 4B:
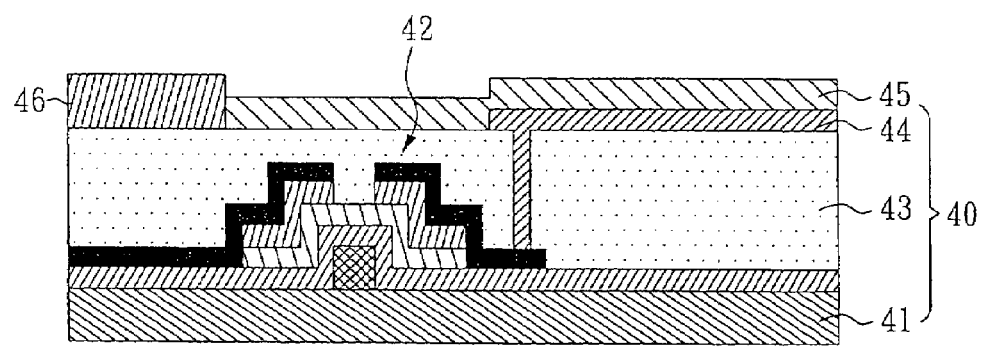
FIG. 4B shows a bottom substrate with a thin film transistor of a flat panel display device according to another preferred embodiment of the present invention.

FIG. 4A shows a schematic drawing of a top substrate 30 with color filter 33 of a flat panel display device, and FIG. 4B shows a bottom substrate 40 with a thin film transistor 42 of the same.

The steps for manufacturing the top substrate 30 and the bottom substrate 40 according to embodiment 2 are similar to those of embodiment 1, except that a homeotropic alignment film 36 of the top substrate is formed on the periphery of a homogeneous alignment film 35 of the top substrate, and a homeotropic alignment film 46 of the bottom substrate is formed on the periphery of a homogeneous alignment film 45 of the bottom substrate. In this embodiment, the homogeneous alignment films 35 of the top substrate 30 and the homogeneous alignment films 45 of the bottom substrate 40 are both formed by photolithography, and the homeotropic alignment films 36 of the top substrate 30 and the homeotropic alignment films 46 of the bottom substrate 40 are both formed on the peripheries of the homogeneous alignment film 35, 45 by utilizing ink-jet printing. Moreover, the locations of the homeotropic alignment film 36, 46 correspond to the area covered by the black matrix 32 of the top substrate 30.

Embodiment 3

Figure 5A:
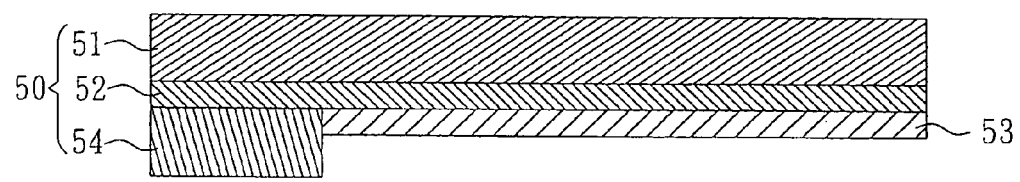
FIG. 5A shows a top substrate of a flat panel display device according to a further preferred embodiment of the present invention.
Figure 5B:
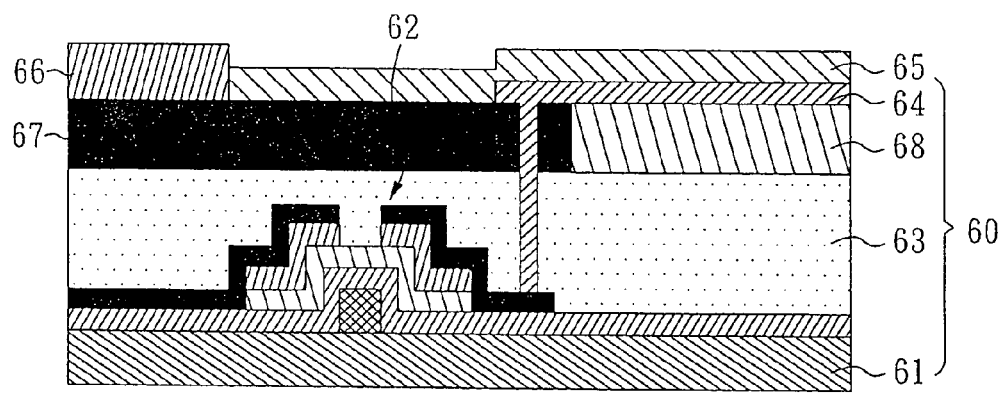
FIG. 5B shows a bottom substrate with a color filter and a thin film transistor of a flat panel display device according to a further preferred embodiment of the present invention.

FIG. 5A shows a schematic drawing of a top substrate 50 of a flat panel display device, and FIG. 5B shows a bottom substrate 60 with a color filter 68 and a thin film transistor 62 of the same.

The steps for manufacturing the top substrate 50 and the bottom substrate 60 according to embodiment 3 are similar to those of embodiment 1, except that the color filter 68 and the thin film transistor 62 are both formed over the bottom substrate 60, a homeotropic alignment film 54 of the top substrate is formed on the periphery of a homogeneous alignment film 53 of the top substrate, and a homeotropic alignment film 66 of the bottom substrate is formed on the periphery of a homogeneous alignment film 65 of the bottom substrate. In this embodiment, the color filter 68 is formed on the same substrate as the thin film transistor 68 to increase the tolerance for assembling the top substrate and the bottom substrate.

Besides, the homogeneous alignment films 53 of the top substrate 50 and the homogeneous alignment films 65 of the bottom substrate 60 are both formed by photolithography, and the homeotropic alignment films 54 of the top substrate 50 and the homeotropic alignment films 66 of the bottom substrate 60 are both formed on the peripheries of the homogeneous alignment film 53, 65 by utilizing roller printing. Moreover, the locations of the homeotropic alignment film 54, 66 correspond to the area covered by the black matrix 67 of the bottom substrate 60.

Embodiment 4

In this embodiment, the steps for manufacturing the top substrate and the bottom substrate of a flat panel display device are similar to those of embodiment 1, except that the color filter and the thin film transistor are both formed over the bottom substrate. Moreover, the homogeneous alignment films formed over the top substrate and the bottom substrate are both formed by ink-jet printing, and the homeotropic alignment films of the same are formed on the homogeneous alignment films by ink-jet printing.

Although the present invention has been explained in relation to its preferred embodiment, it is to be understood that many other possible modifications and variations can be made without departing from the scope of the invention as hereinafter claimed.

What is claimed is:

1. A method for manufacturing a substrate of a flat panel display device, comprising the following steps:
    providing a substrate having a patterned transparent electrode thereon; and
    forming an alignment layer on the surface of the patterned transparent electrode, wherein the alignment layer comprises a homeotropic alignment film and a homogeneous alignment film adjacent to the homeotropic alignment film,
    wherein the homeotropic alignment film is formed on or on a periphery of the homogeneous alignment film by printing.

2. The method as claimed in claim 1, wherein the homeotropic alignment film is formed on the homogeneous alignment film by ink-jet printing.

3. The method as claimed in claim 1, wherein the homeotropic alignment film is formed on the periphery of the homogeneous alignment film by ink-jet printing.

4. The method as claimed in claim 1, wherein the homeotropic alignment film is formed on the homogeneous alignment film by roller printing.

5. The method as claimed in claim 1, wherein the homeotropic alignment film is formed on the periphery of the homogeneous alignment film by roller printing.

6. The method as claimed in claim 1, wherein the homogeneous alignment film is formed by printing or photolithography.

7. The method as claimed in claim 1, wherein the homeotropic alignment film is formed over an opaque area of the substrate.

8. The method as claimed in claim 5, wherein the homeotropic alignment film makes the nematic liquid crystal molecules to tilt at a pretilt angle larger than 60 degrees.

9. The method as claimed in claim 1, wherein the homogeneous alignment film is formed over an opaque area or a transparent area of the substrate.

10. The method as claimed in claim 1, wherein a material of the homogeneous alignment film is polyimide.

11. The method as claimed in claim 1, wherein a material of the homeotropic alignment film is polyimide.

12. The method as claimed in claim 1, wherein the substrate of the flat panel display device further comprises a color filter.

13. The method as claimed in claim 1, wherein the substrate of the flat panel display device further comprises a thin film transistor.

14. The method as claimed in claim 1, wherein the substrate of the flat panel display device further comprises a color filter and a thin film transistor.

* * * * *